(12) United States Patent
Matsumoto (10) Patent No.: US 7,793,403 B2
(45) Date of Patent: Sep. 14, 2010

(54) MANUFACTURING METHOD OF OPTICAL COMPONENT OR MOLDING DIE THEREFOR

(75) Inventor: Yasuhiro Matsumoto, Okazaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 931 days.

(21) Appl. No.: 11/645,420

(22) Filed: Dec. 26, 2006

(65) Prior Publication Data

US 2007/0160706 A1    Jul. 12, 2007

(30) Foreign Application Priority Data

Dec. 27, 2005  (JP)  ............................. 2005-375470
Dec. 27, 2005  (JP)  ............................. 2005-375481

(51) Int. Cl.
   *B23Q 11/00*  (2006.01)
   *A23P 1/00*   (2006.01)
(52) U.S. Cl. ........................ 29/558; 409/131; 409/132
(58) Field of Classification Search ................. 29/557, 29/558; 409/131, 132; 425/542
See application file for complete search history.

(56) References Cited

U.S. PATENT DOCUMENTS

| 3,863,525 | A | * | 2/1975 | Cale | ........................... | 76/107.1 |
| 4,047,469 | A | * | 9/1977 | Sakata | ........................ | 409/132 |
| 4,856,234 | A | * | 8/1989 | Goins | ........................... | 451/42 |
| 5,938,381 | A | * | 8/1999 | Diehl et al. | .................. | 409/132 |
| 5,942,168 | A | * | 8/1999 | Ichikawa et al. | ........... | 264/40.1 |
| 2003/0047046 | A1 | * | 3/2003 | Havskog | ........................ | 83/48 |
| 2007/0009629 | A1 | * | 1/2007 | Okumura et al. | ............ | 425/542 |

FOREIGN PATENT DOCUMENTS

| JP | 07-136804 | 5/1995 |
| JP | 2000-094270 | 4/2000 |
| JP | 2000-298509 | 10/2000 |
| JP | 2002-036001 | 2/2002 |

\* cited by examiner

*Primary Examiner*—David P Bryant
*Assistant Examiner*—Jacob J Cigna
(74) *Attorney, Agent, or Firm*—Brinks Hofer Gilson & Lione (57) ABSTRACT

A method of manufacturing an optical component or a molding die for the optical component, the method comprising the steps of: cutting a surface of a work with a tool by rotating the tool around its axis with a cutting edge facing outward and moving in a circle to cut the work surface at a point of the circle while relatively moving the tool and the work in a line direction crossing to the axis of the tool at a predetermined feed speed; and cutting the work surface in a next line after relatively moving the tool and the work in a pitch direction perpendicular to the line direction by a pick feeding distance in such a condition that: tool rotation speed (S): 10000 to 30000 rpm; feed speed (F): 300 to 2000 mm/min; rotating radius (D) of a cutting edge of a tool: 5 to 15 mm; pick feeding distance (f): 0.01 to 0.04 mm; nose radius (r) of a cutting edge of a tool: 5 to 20 mm. The method allows to form a surface of a work into a free-form surface having a surface roughness of approximately 10 nm or less.

20 Claims, 5 Drawing Sheets

MANUFACTURING METHOD OF OPTICAL COMPONENT OR MOLDING DIE THEREFOR

CROSS-REFERENCE TO RELATED APPLICATIONS

This application is based upon and claims the benefit of priority from each of the prior Japanese Patent Application Nos. 2005-375470, 2005-375481 filed on Dec. 27, 2005, the entire contents of which are incorporated herein by reference.

BACKGROUND OF THE INVENTION

1. Field of the Invention

The present invention relates to a manufacturing method of an optical component having a free-form surface, or a molding die of the optical component, for example, suitable for producing mold cores for fθ lenses or free-form surface mirrors for projection TVs.

2. Description of Related Art

Figure 1:
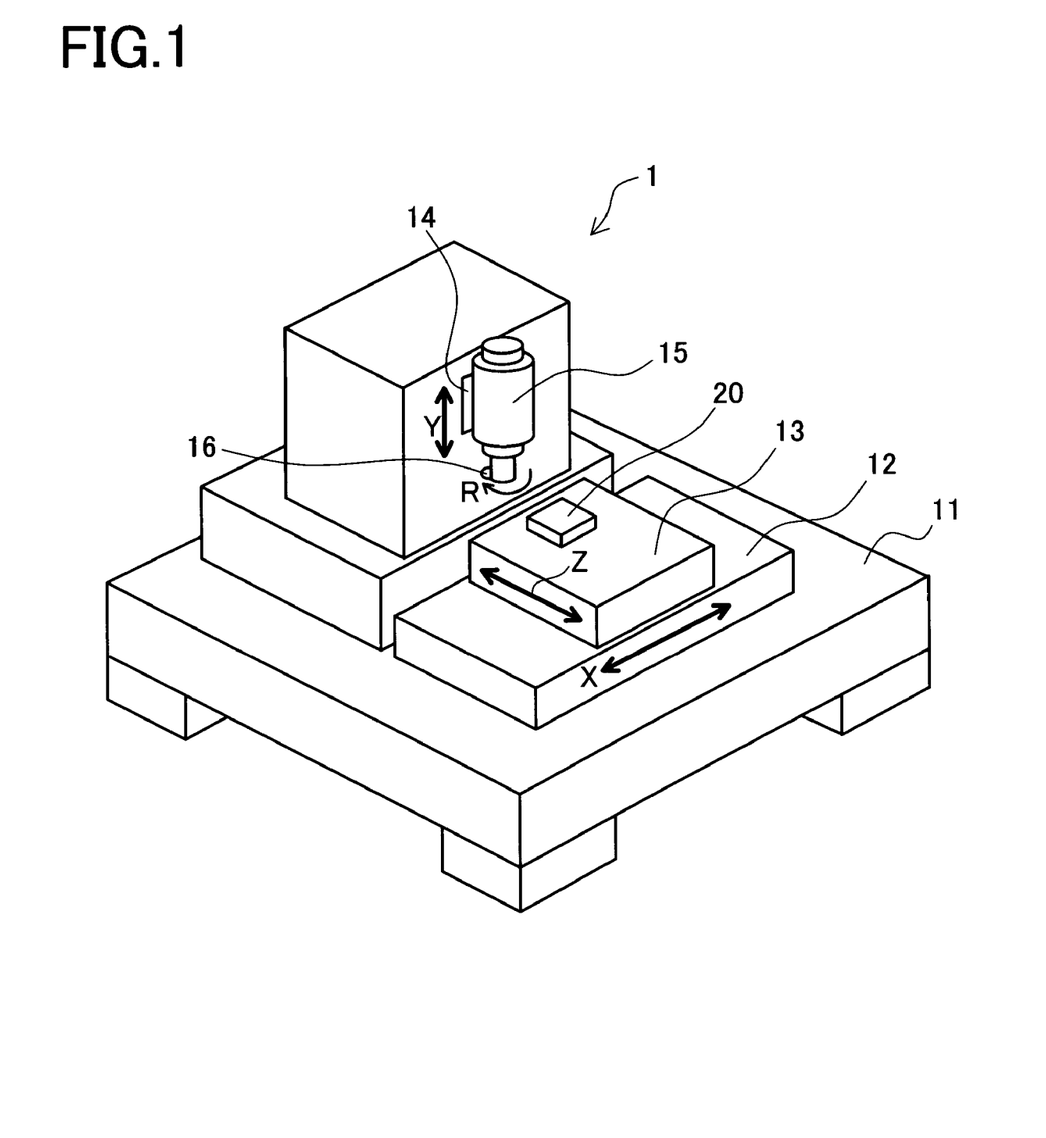
FIG. 1 is a perspective view illustrating an schematic structure of a fly cutting machine.

Recently, for projection mirrors for projection TVs, mirrors having free-form mirror surface have come to be used. Particularly since rear projection TVs require the thinnest possible optics, free-form surface mirrors are becoming important. To form an optical component having a free-form surface with a metal die, it is necessary to create the metal die, which has the same surface as the desired free-form surface. Generally, in forming a free-form surface without a rotation axis by a cutting work, a fly cutting machine as indicated in FIG. 1 is used (e.g., see Japanese Unexamined Patent Publication Nos. 2000-94270, 2000-298509).

Such a fly cutting machine 1 has a machine platen 11 on which an X-axial slide table 12 and a Z-axial slide table 13 are laid in step-wise. A Y-axial slide table 14 is on the machine platen 11, also. To the Y-axial slide table 14, a tool spindle 15 is attached. To an end part of the tool spindle 15, a tool 16 is attached. The axial slide tables 12, 13, 14 are controlled to move in the respective axial directions. The tool spindle 15 is controlled so that the tool 16 is rotated around a main axis of the tool spindle 15.

The fly cutting machine 1 controls movements of a work 20 placed on the Z-axial slide table 13 in two axial directions; X-axis and Z-axis, in an X-Z plane. Further, the fly cutting machine 1 controls the tool 16 in a single, Y-axial direction while rotating the tool 16 at a predetermined rotation speed. In this way, it is possible to control the tool 16 and the work 20 relatively in three axial directions to carry out a cutting work. In addition to such a fly cutting machine, there is known a machine that employs three-axial direction control in which a work table is controlled in single axial direction and a tool table is controlled in two axial directions.

Generally in a cutting work by the fly cutting machine 1, as illustrated in FIG. 4 of the Japanese Unexamined Patent Publication No. 2000-94270, the tool 16 and the work 20 are moved relatively in a rotating circumferential direction of the tool 16 to cut the work 20 in a line. Then, the tool 16 and the work 20 are moved relatively in a rotating axial direction of the tool 16 to cut the work 20 in the next line. In the course of these procedures, there appears a tool mark in a cut surface by the fly cutting work, as illustrated in, e.g., FIG. 8 of the Japanese Unexamined Patent Publication No. 2000-94270. Additionally, this cutting work is carried out every time in one-way and single direction. This is because the one-way cutting stabilizes a relation between a rotating direction of the tool 16 and a moving direction of the work 20 to produce a uniform characteristic of worked surface.

In recent years, since more small-sized and more high-precision optical components are needed, further improvement of a machining accuracy has been required. Particularly in projection mirrors for projection TVs, even a slight tool mark may cause flare, because its image is magnified. However, in the aforementioned conventional manufacturing method of mold cores, there has been a problem that a surface roughness increases in proportion to cutting length. This sets a practical limit to a forming accuracy of the cutting work to a surface roughness of approximately 0.7 μm in a cut surface of a work, and thus it is difficult to carry out a cutting work at a surface roughness of about 10 nm.

Additionally, in the method, the cutting work is carried out in one direction only as described before. Thus, it takes excessive time to merely move backward. This raises a problem that the whole working time is long and the productivity is low. Further, long working time is apt to change ambient temperature during working. As a result, a work or a machine may be subtly deformed due to a temperature change, so that the worked surface may become wavy. However, a reciprocating work causes variations in characteristics of the worked surfaces in between forward and backward working, leading to another problem that a worked surface cannot be uniform.

SUMMARY OF THE INVENTION

The present invention has been made to overcome the above problems in the conventional art. That is, the present invention has an object to provide a method of manufacturing an optical component or molding die therefor, capable of machining or processing a surface of a work by a fly cutting machine to produce a free-form surface with a surface roughness about within 10 nm. Additionally it has an object to provide a method of manufacturing an optical component or molding die therefor, capable of producing a uniform worked surface in short time.

In order to achieve the above object, there is provided a method of manufacturing an optical component or a molding die for the optical component, the method comprising the steps of cutting a surface of a work with a tool by rotating the tool around its axis with a cutting edge facing outward and moving in a circle to cut the work surface at a point of the circle while relatively moving the tool and the work in a line direction crossing to the axis of the tool at a predetermined feed speed; and cutting the work surface in a next line after relatively moving the tool and the work in a pitch direction perpendicular to the line direction by a pick feeding distance; wherein the above steps are carried out under the following conditions:

$10000 \leq S \leq 30000$;

$(F/S)^2/8D \leq -10$ nm;

$f^2/8r \leq 10$ nm, where

S: tool rotation speed (rpm);
F: feed speed (mm/min);
D: rotating radius of a cutting edge of a tool (mm);
f: pick feeding distance (mm);
r: nose radius of a cutting edge of a tool (mm).

The manufacturing method according to the present invention allows a high feeding speed (F) by using a high tool rotation speed (S), so that smoother surface can be obtained to form a surface of a work into a free-form surface having a surface roughness of approximately 10 nm or less. The method of the present invention includes a manufacturing method of a molding die which employs the cutting work under the above-described condition, a direct manufacturing method of an optical component using the cutting work under the above condition, and a manufacturing method of an optical component using a molding die produced by the cutting work under the above condition.

Further, there is provided a manufacturing method of an optical component or a molding die of the optical component comprising the steps of: cutting a surface of a work with a tool by rotating the tool around its axis with a cutting edge facing outward and moving in a circle to cut the work surface at a point of the circle while relatively moving the tool and the work in a line direction crossing to the axis of the tool at a predetermined feed speed; cutting the work surface by a next line after relatively moving the tool and the work in a pitch direction perpendicular to the line direction by a pick feeding distance; and polishing a worked surface after completion of the cutting steps, wherein the above cuttings are carried out under the following conditions:

$10000 \leq S \leq 30000$;
$(F/S)^2/8D \leq 40$ nm;
$f^2/8r \leq 40$ nm, where
S: tool rotation speed (rpm);
F: feed speed (mm/min);
D: rotation radius of a cutting edge of a tool (mm);
f: pick feeding distance (mm);
r: nose radius of a cutting edge of a tool (mm).

In this way, a metal die having a free-form surface with a surface roughness Ry of 10 nm or less can also be produced.

According to the manufacturing method of an optical component or a molding die for the optical component, a surface of a work can be formed into a free-form surface having a surface roughness of about 10 nm or less, or more, a uniform worked surface can be produced in short time.

DETAILED DESCRIPTION OF THE PREFERRED EMBODIMENTS

A detailed description of a preferred embodiment of the present invention will now be given referring to the accompanying drawings. The present embodiment is an application of the present invention to a manufacturing method of a molding die for an optical component having a free-form surface.

In a fly cutting machine 1 used in the present embodiment, as illustrated in FIG. 1, a machine platen 11 is provided with an X-axial slide table 12 and a Z-axial slide table 13 laid in step-wise. A Y-axial slide table 14 is provided with a tool spindle 15 attached thereto. To the lower end part of the tool spindle 15, a tool 16 is attached. The axial slide tables 12, 13, 14 are controlled to move in respective axial directions. The tool spindle 15 is controlled so as to rotate the tool 16 around a main axis of the spindle. A basic structure of this fly cutting machine 1 is the same as that of the conventional art.

The fly cutting machine 1 is arranged to set a work 20, which is placed on the Z-axial slide table 13, in a predetermined position in an X-Z plane by movements of the X-axial slide table 12 and the Z-axial slide table 13. Further, the fly cutting machine 1 can be controlled to move the work 20 in a predetermined direction at a predetermined speed. Furthermore, the tool 16 is rotated at a predetermined rotation speed by the tool spindle 15 and at the same time its position is controlled in the Y-axial direction with the Y-axial slide table 14.

In the present embodiment, as illustrated in FIG. 1, the tool 16 is relatively brought closer to the work 20 while rotated to cut the work 20. In this view the left back side surface of the work 20 is the surface to be cut. The work 20 is moved in the X-Z plane while being cut by the tool 16. For example, while the tool 16 is rotating in the direction indicated by the arrow R in the figure, the X-axial slide table 12 is moved from the right-back side in the figure to the left-front side, i.e., in the X-axial direction. By this process, the work 20 is cut in a line. In this process, the Z-axial slide table 13 is controlled depending on a desired shape of the cut surface.

Hereinafter, a movement of the work 20 in the X-Z plane is referred to as a feed movement. The direction (mainly in the X-axial direction) of the feed movement corresponds to a line direction. The movement speed (relative speed to the tool 16) of the work 20 in the X-Z plane in cutting is referred to as a feed speed F.

Upon completion of a cutting work in one line, the work 20 is temporarily moved in the Z-axial direction away from the tool 16 to move the tool 16 in the Y-axial direction by a predetermined distance and then the work 20 is moved in the X-axial direction to the right backward position (initial position). Next, the tool 16 and the work 20 are set in contact again to carry out cutting of the next line. By repeating these steps a work surface can be formed into desired shape. Hereinafter, a moving direction of the tool 16 in the Y-axial direction by one line is referred to as a pick feeding direction. Further, the distance in the pick feeding direction per line is referred to as a pick feeding distance f. For each of the slide tables 12, 13, 14, tables of which accuracy of position control is 0.01 µm or less are used.

Figure 2:
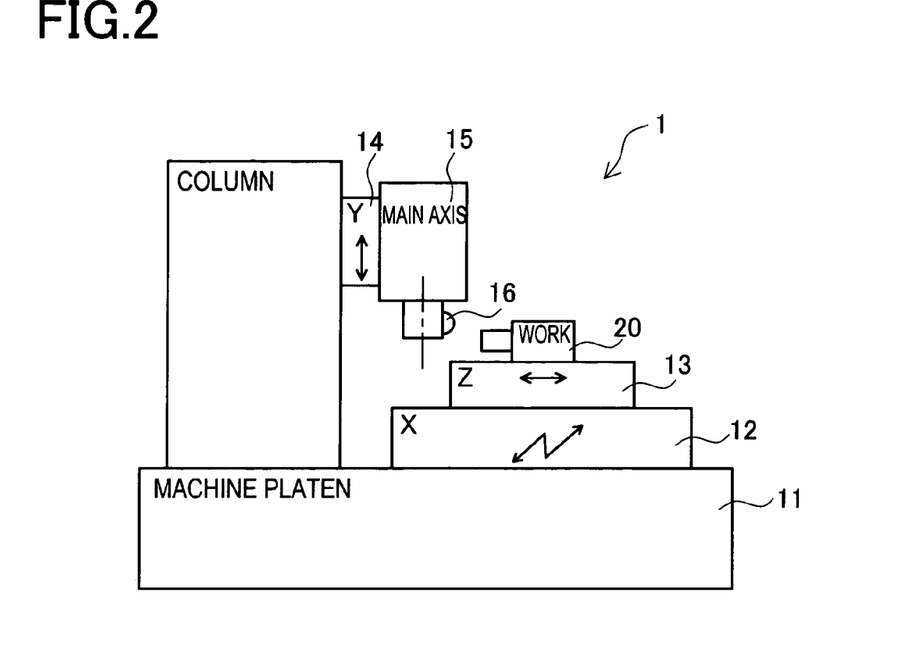
FIG. 2 is a side view illustrating the schematic structure of the fly cutting machine.

The tool 16 is a single-crystal diamond tool. The end part of the tool 16 is, as illustrated in FIG. 2, formed in a circular shape. The radius of the circular shape is referred to as a tool nose radius. Although its figure appears to be large in the figure, a limitation due to material makes it impossible to use too large one for the tool 16. This is because it costs more to produce such a large tool 16, as well as it is very difficult in manufacturing it. Thus, the tool nose radius r is substantially determined in a range of 5 mm to 20 mm.

Figure 3:
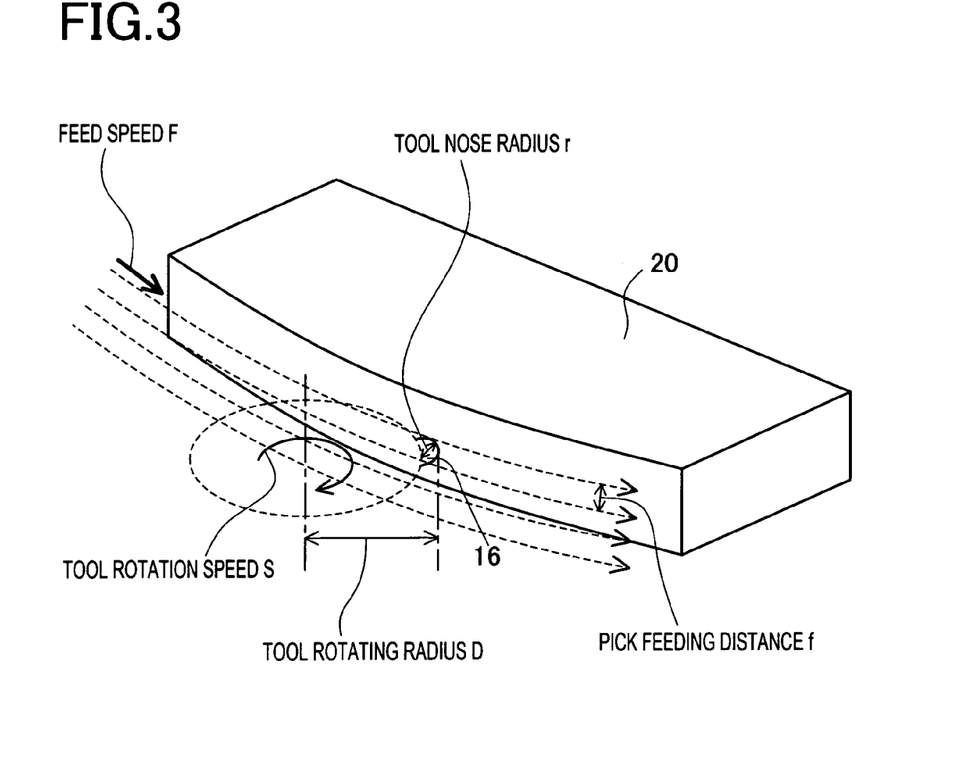
FIG. 3 is a view explaining a relationship between parameters.

Here, a theoretical surface roughness is obtained as follows with each parameter indicated in FIG. 3, that is, the rotation speed S and the rotating radius D of the tool 16, the relative movement speed (feed speed) F of the tool 16 and the work 20 in the feeding direction, the tool nose radius r of the tool 16, the pick feeding distance f. A surface roughness A1 is the roughness in the feeding direction along the cutting line and a surface roughness A2 is the roughness in the pick feeding direction.

$A1 = (F/S)^2/8D$ (feeding direction)
$A2 = f^2/8r$ (pick feeding direction)

≦First Method> In the first method of the present embodiment, the above parameters are set as follows to bring both surface roughness A1, A2 to 10 nm or less. First, since the tool nose radius r has a length limit as described above, its value is set in a range of 5 mm to 20 mm. Next, other parameters are set in such a range as below:
Rotating radius D of the tool 16: 5 mm-15 mm;
Rotation speed S of the tool 16: 10000 rpm-30000 rpm;
Feed speed F of the work 20: 300 mm/min-2000 mm/min;
Pick feeding distance f: 0.01 mm-0.04 mm.

When the parameters are set as above, the widest ranges of theoretical surface roughness A1, A2 in this case are:
A1: 0.3 nm-1000 nm;
A2: 0.63 nm-40 nm.

Incidentally, since the parameters are correlated, it is necessary to select a combination of parameters to fulfill such condition that the above A1, A2 become 10 nm or less.

For instance, if the rotating radius D is set to 5 mm or less, the feed speed F should be slower according to D in order to fulfill the condition for producing the desired surface roughness. This is not preferable because the working time is long. On the other hand, if the tool rotating radius D is set to 15 mm or more, mechanical vibrations due to rotation are prone to occur so that machining accuracy decreases. As a result of this, the surface roughness of the work 20 after worked is deteriorated in comparison with the theoretical roughness. Thus, the rotating radius D is preferably set in a range of 5 mm to 15 mm.

In addition, the rotation speed S is controlled by rotation control of the tool spindle 15. If the rotation speed S is set to 10000 rpm or less, as in the case with D, the feed speed should be slower corresponding to S. This is not preferable because the working time is long. On the other hand, if the tool rotation speed S is set to 50000 rpm or more, mechanical vibrations due to runouts of the rotation axis of the tool 16 are prone to occur. As a result of this, machining accuracy decreases, so that the surface roughness of the work 20 after worked is deteriorated in comparison with the theoretical roughness. Thus, the rotation speed S is preferably set in a range of 10000 rpm to 50000 rpm, more preferably, 10000 rpm to 30000 rpm.

In fly cutting as in the present invention, the surface roughness Ry can be reduced if the tool rotation speed S is increased. However, in the fly cutting, machine vibration caused when increasing the tool rotation speed S tends to influence more to machining accuracy than the case of end milling. The method in the present invention keeps the tool rotation speed S 30000 rpm or less, and achieves the surface roughness Ry of 10 nm or less by other working conditions.

Additionally, the pick feeding distance f of 0.01 mm or less increases the number of lines excessively, so that working time is increased, leading to a decrease in productivity. On the other hand, if the pick feeding distance f is 0.04 mm or more, the tool nose radius r should be 20 mm or more to get the theoretical roughness 10 nm or less and this is not practical. Therefore, the pick feeding distance f is preferably set in a range of 0.01 mm to 0.04 mm.

The inventor used the fly cutting machine 1 with a combination of parameters indicated as follows to confirm that a cutting work for a surface roughness of 10 nm or less is achieved. For instance, when the tool rotation speed S=20000 rpm; the feed speed F=600 mm/min; the tool rotation radius D=11 mm; the pick feeding distance f=0.02 mm; the tool nose radius r=10 mm, the theoretical surface roughness becomes: A1=10 nm; A2=5 nm. The worked surface of a metal die produced under these conditions has the surface roughness of 10 nm or less.

Figure 4:
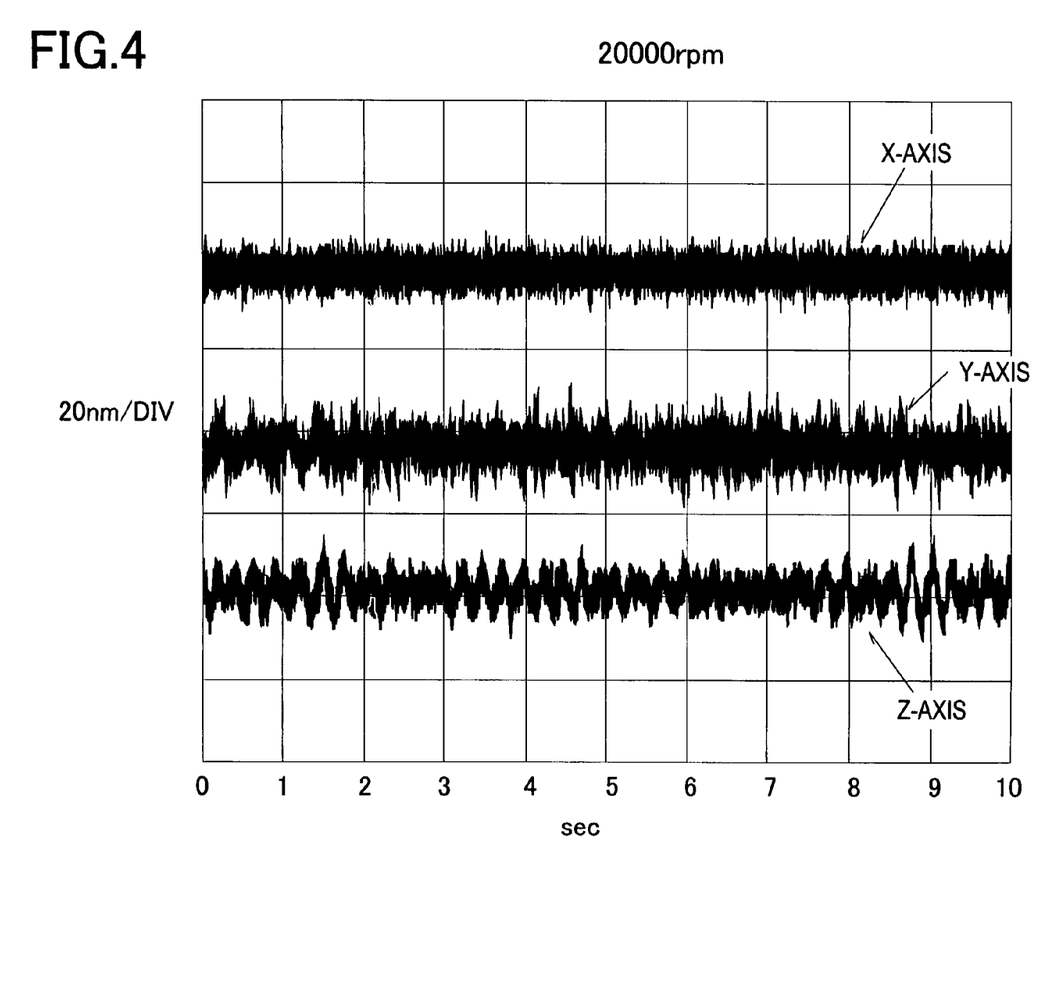
FIG. 4 is a graph indicating vibration data at a tool rotation speed of 20000 rpm.
Figure 5:
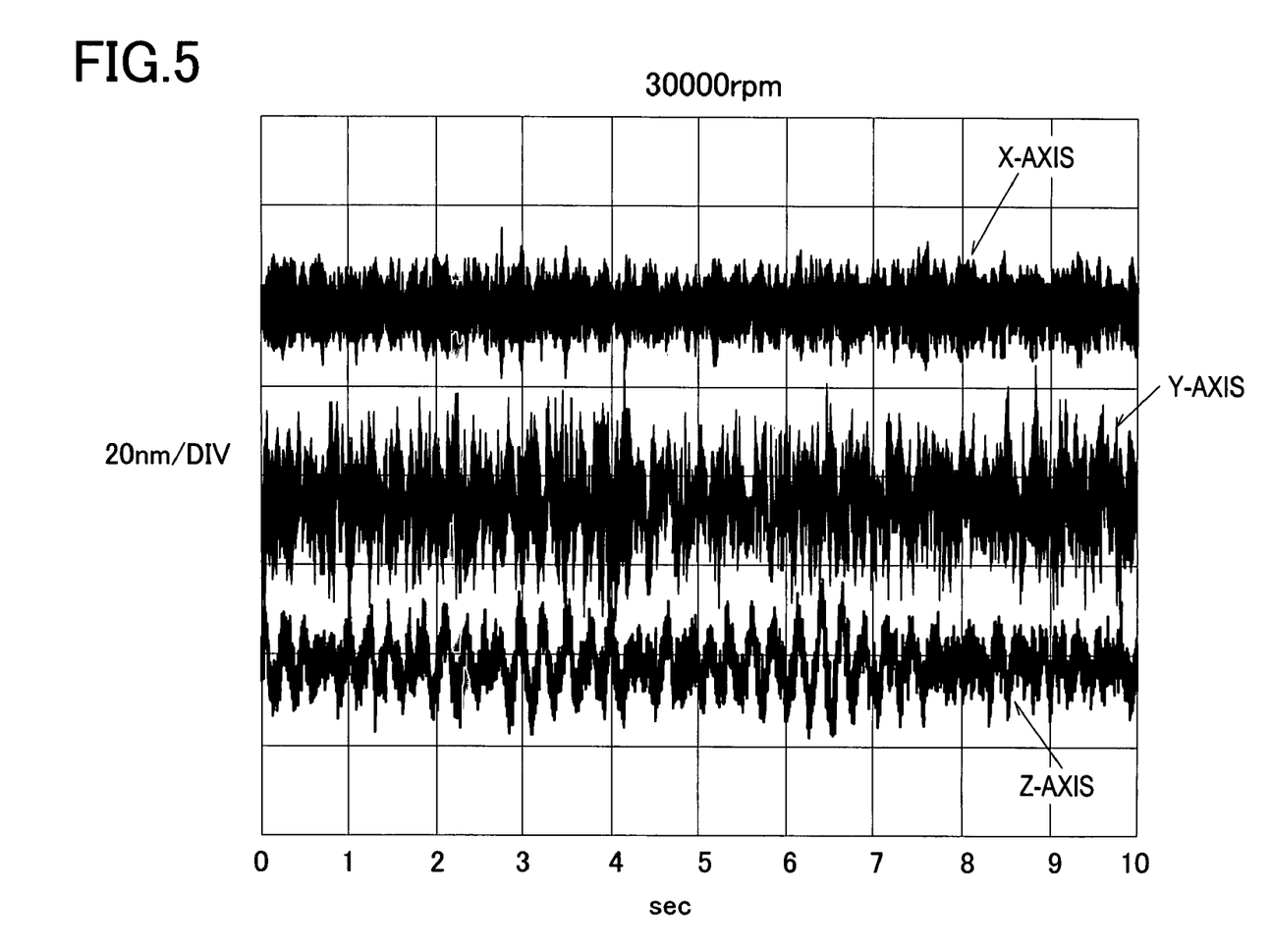
FIG. 5 is a graph indicating vibration data at a tool rotation speed of 30000 rpm.

As described above, the tool rotation speed S is set to 20000 rpm. Since in that case vibrations are reduced comparing to the case of 30000 rpm, which is advantageous in machine accuracy. In other words, the tool rotation speed S is more preferably in a range of 10000 rpm to 20000 rpm. The observation result of this is indicated in FIGS. 4 and 5, each of which shows scale signals for feed back control in determining a position of axis of a fly cutting machine, the signals which are input to a personal computer through an NC unit. FIG. 4 shows the signals generated at the tool rotation speed of 20000 rpm and FIG. 5 shows the signals generated at the tool rotation speed of 30000 rpm. For the scale, the LIP382, product of Heidenhain Corp. was used. The figures show that vibrations in respective axes are smaller at the speed of 20000 rpm than at the speed of 30000 rpm. Incidentally, the same result was attained by using the BS78 of Sony Manufacturing Systems Corp. for the scale.

As described above in detail, according to the first working method of the present embodiment using the fly cutting machine 1, the fly cutting machine 1 performs three-axial direction control so that cutting of a free-form surface is possible. Further, each parameter is set to bring the theoretical surface roughness A1, A2 to 10 nm or less, the surface of the work 20 is machined or worked so that its surface roughness become 10 nm or less. Thus, the method includes manufacturing conditions of a fly cutting machine that works the surface of the work into a free-form surface with a surface roughness of approximately 10 nm or less. After the work is cut, the worked surface may be polished.

≦Second Method> In a second method of the present embodiment, each parameter is set to bring the surface roughness A1, A2 to about 40 nm to carry out fly cutting, and then the work is polished. By this, only the convex portions are scraped off from the tool marks and finally the surface roughness becomes 10 nm or less. Polishing may be carried out in a common manner.

In the present method, each parameter is set as follows to bring the surface roughness A1, A2 to approximately 40 nm:
Rotating radius D of the tool 16: 5 mm-15 mm;
Rotation speed S of the tool 16: 10000 rpm-30000 rpm;
Feed speed F of the work 20: 300 mm/min-20000 mm/min;
Pick feeding distance f: 0.04 mm-0.08 mm;
Tool nose radius r of the tool 16: 5 mm-20 mm.

In this method, each parameter is set to bring the theoretical surface roughness to 40 nm or less. The widest ranges of theoretical surface roughness A1, A2 in this case are:
A1 : 0.3 nm-1000 nm;
A2: 10 nm-160 nm.

For instance, when the tool rotation speed S=20000 rpm; the feed speed F=1000 mm/min; the tool rotating radius D=11 mm; the pick feeding distance f=0.05 mm; the tool nose radius r=10 mm, the theoretical surface roughness becomes: A1=28 nm; A2=31 nm.

After cutting the work in this way, polishing step is carried out. By the polishing step, a metal die which has the worked surface with the surface roughness Ry of 10 nm or less can be produced.

As described above in detail, according to the second method of the present embodiment using the fly cutting machine 1, the fly cutting machine 1 carries out three-axial control and thus cutting of a free-form surface is possible. Additionally, since each parameter is set to bring both of the theoretical surface roughness A1, A2 to 40 nm or less, the surface of the work 20 is worked to have the surface roughness 40 nm or less. Further, since polishing step is carried out after the cutting step, the surface roughness of the worked surface after polishing is made 10 nm or less. Thus, the method includes manufacturing conditions of a fly cutting machine that can work the surface of the work into a free-form surface with a surface roughness of approximately 10 nm or less.

Figure 6:
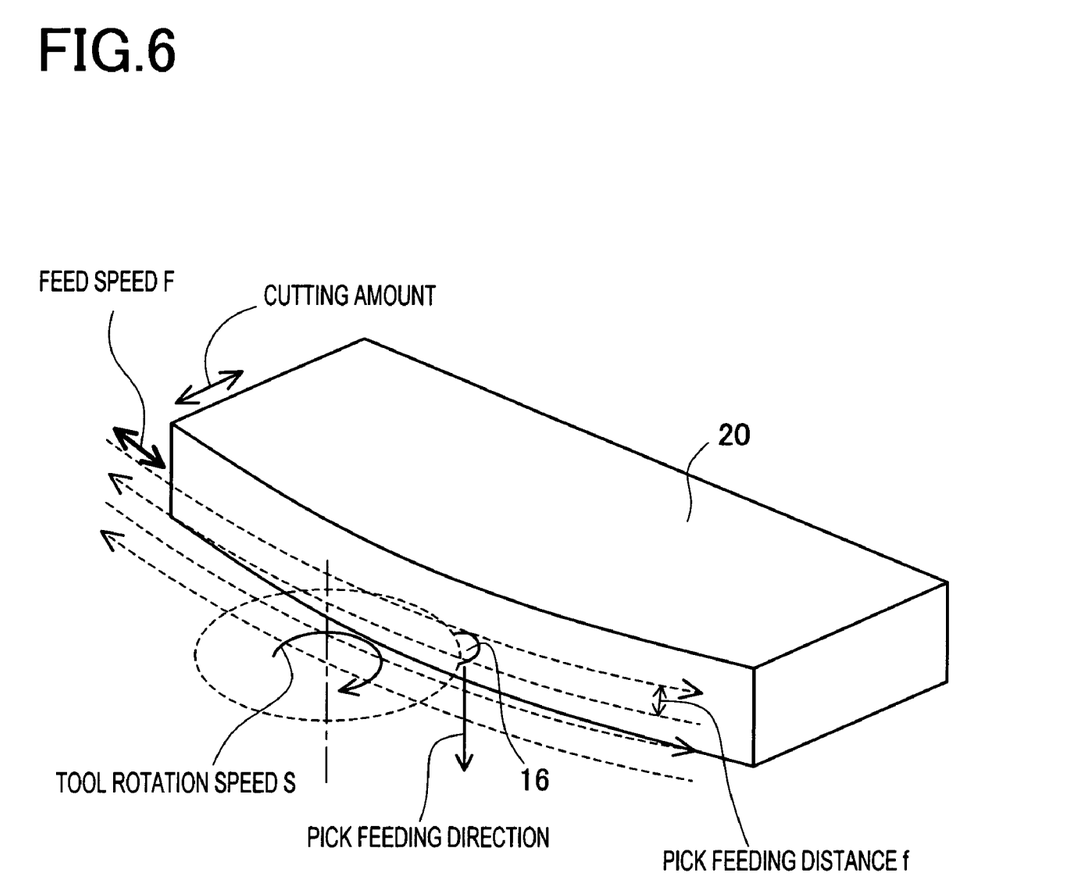
FIG. 6 is an explanatory view indicating a feeding direction in a third manufacturing method according to the embodiment of the present invention.

≦Third Method> In a third method of the present embodiment, after the work is cut in one line, the position of the work 20 is kept unchanged only to move the tool 16 in the Y-axial direction by a predetermined amount. Then, the next line is cut while moving the work 20 in the reverse direction. Here, at the contact surface of the tool 16 and the work 20, cutting wherein moving direction by rotation of the tool 16 and the direction by feed movement of the work 20 are the same direction is referred to as downward cutting, and cutting where the moving directions are reverse is referred to as upward cutting. Specifically, as illustrated in FIG. 6, the cutting is carried out in reciprocating directions of down and up. Since manners of cutting of the tool 16 into the work 20 are different in downward and in upward, the cutting characteristics are not exactly the same. Incidentally, in a conventional manner, cutting work is carried out in downward only.

In the present method, the rotation speed S of the tool 16 is set to 10000 rpm or more. Further, the feed speed F is controlled in order that F (mm/min)/S(rpm)=0.1 mm/rev or less. That is, when the tool rotation speed S=10000 rpm, the feed speed F is set to 1000 mm/min or less. Since this makes the length by which the tool 16 cuts the work 20 with one rotation extremely short, the difference of cutting loads between the feeding directions becomes slight.

However, when the rotation speed S of the tool 16 is excessively high, the worked surface of the work 20 becomes deteriorated in comparison to the theoretical roughness, as aforementioned. Therefore, the tool rotation speed S is preferably set in a range of 10000 rpm to 30000 rpm.

Further, in the present method, a cutting amount is adjusted between downward and upward and therefore cut surface can be still uniform. The cutting amount is the depth by which the cutting edge of the tool cuts into the work 20 and it corresponds to the distance between the work 20 and the tool 16 in the Z-axial direction. Here, cutting is carried out so that the cutting amount of the tool 16 into the work 20 is slightly smaller in upward than in downward. That is, in upward line, the distance between the work 20 and the tool 16 in the Z-axial direction is adjusted so that it becomes slightly bigger throughout the one line. This is because when operated while the cutting amount is unchanged, an actual cutting amount in upward direction tends to become larger than in downward direction. By conducting such control as above, the difference of the cutting characteristics in reciprocating cutting at the same rotation speed and feed speed can be negligible.

Incidentally, as a method to adjust the cutting amount, there is a method of creating a cutting program which changes control values of the Z-axial slide table 13 depending on forward and backward and then cutting according to the program. Otherwise, when a machine has a mechanism wherein a feed back scale for the Z-axial slide table 13 can be shifted back and forth thereto, the cutting amount in upward cutting can be controlled temporarily by shifting the back scale only.

Here, in the method of the present embodiment, the parameters are set as follows:
Tool rotation speed (S): 10000 rpm-30000 rpm;
Feed speed (F): 300 mm/min-2000 mm/min;
Rotating radius of cutting edge of tool (D): 5 mm-15 mm;
Pick feeding amount (f): 0.01 mm-0.04 mm;
Nose radius of cutting edge of the tool (r): 5 mm-20 mm;
Cutting amount: 1 μm-20 μm.

As described above in detail, according to the manufacturing method of the present embodiment, when the feeding direction is set back and forth direction by increasing the rotation speed of the tool 16 to slow down the feed speed, the difference of cutting loads can be negligible. Further, by changing the cutting amount depending on the feeding directions, difference of cutting loads can be still smaller. That is, even if reciprocating cutting is carried out, the cutting characteristics can be almost the same. Thus, whole cut surface of the work can be almost uniform. As described above, the method can produce a uniform worked surface in short time.

The present invention is not restricted to the above-described embodiments but needless to say, may be improved or modified in various ways within a scope not departing from the present invention.

For instance, in the metal die produced by each method described above, only the part, to which optical surface of the desired optical component is transferred, needs to have a surface roughness of 10 nm or less. In the case of mirrors, only the surface which becomes a deposition surface is required to have such roughness. To other parts, the same accuracy as in the conventional art can be applied. As an optical component, lens can be created from the metal die of the present embodiment. Additionally, the above embodiment is explained taking for example a manufacturing method of a metal die, however, it can also be applied to a manufacturing method of an optical component by direct cutting of an optical material using the same manufacturing conditions.

What is claimed is:

1. A method of manufacturing an optical component or a molding die for the optical component, the method comprising the steps of:

cutting a surface of a work with a tool by rotating the tool around its axis with a cutting edge facing outward and moving in a circle to cut the work surface at a point of the circle while relatively moving the tool and the work in a line direction crossing to the axis of the tool at a predetermined feed speed; and cutting the work surface in a next line after relatively moving the tool and the work in a pitch direction perpendicular to the line direction by a pick feeding distance;

wherein the above steps are carried out under the following conditions:

$10000 \leq S \leq 30000$;
$(F/S)^2/8D \leq 10$ nm;
$f^2/8r \leq 10$ nm, where
S: tool rotation speed (rpm);
F: feed speed (mm/min);
D: rotating radius of a cutting edge of a tool (mm);
f: pick feeding distance (mm);
r: nose radius of a cutting edge of a tool (mm).

2. The manufacturing method of the optical component or the molding die of the optical component according to claim 1, wherein the tool rotation speed S (rpm) is in a range of:
$10000 \leq S \leq 20000$.

3. The manufacturing method of the optical component or the molding die of the optical component according to claim 1, comprising the step of:

polishing the worked surface after completion of the cutting steps.

4. The manufacturing method of the optical component or the molding die of the optical component according to claim 1, wherein the feed speed F (mm/min) is in a range of:
$300 \leq F \leq 2000$.

5. The manufacturing method of the optical component or the molding die of the optical component according to claim 1,
wherein the rotation radius D (mm) of the cutting edge of the tool is in a range of:
$5 \leq D \leq 15$.

6. The manufacturing method of the optical component or the molding die of the optical component according to claim 1,
wherein the pick feeding distance f (mm) is in a range of:
$0.01 \leq f \leq 0.04$.

7. The manufacturing method of the optical component or the molding die of the optical component according to claim 1,
wherein the nose radius r (mm) of the cutting edge of the tool is in a range of:
$5 \leq r \leq 20$.

8. The manufacturing method of the optical component or the molding die of the optical component according to claim 1,
wherein the feed speed F (mm/min), the rotating radius D (mm) of the cutting edge of the tool, the pick feeding distance f (mm), the nose radius r (mm) of the tool are in ranges of:
$300 \leq F \leq 2000$;
$5 \leq D \leq 15$;
$0.01 \leq f \leq 0.04$;
$5 \leq r \leq 20$.

9. The manufacturing method of the optical component or the molding die of the optical component according to claim 1,
wherein the cutting steps are performed reciprocally by moving the work forward and backward alternately in the line direction.

10. The manufacturing method of the optical component or the molding die of the optical component according to claim 9,
wherein the cutting steps are performed under a condition that the feed speed F (mm/min) and the tool rotation speed S (rpm) are in a relation of:
$F/S \leq 0.1$ (mm/rev).

11. The manufacturing method of the optical component or the molding die of the optical component according to claim 9,
wherein a cutting amount into the work by the tool is larger in a down line where a moving direction of the cutting edge of the tool in scraping off the work at a cutting point and a moving direction of the work by a line movement relative to a center of rotation of the tool are equal than in an up line, the reverse direction of the down line.

12. A method of manufacturing an optical component or a molding die for the optical component, the method comprising the steps of:
cutting a surface of a work with a tool by rotating the tool around its axis with a cutting edge facing outward and moving in a circle to cut the work surface at a point of the circle while relatively moving the tool and the work in a line direction crossing to the axis of the tool at a predetermined feed speed; and
cutting the work surface in a next line after relatively moving the tool and the work in a pitch direction perpendicular to the line direction by a pick feeding distance;
wherein the above steps are carried out under the following conditions:
$10000 \leq S \leq 50000$;
$(F/S)^2/8D \leq 10$ nm;
$f^2/8r \leq 10$ nm,
where
S: tool rotation speed (rpm);
F: feed speed (mm/min);
D: rotating radius of a cutting edge of a tool (mm);
f: pick feeding distance (mm);
r: nose radius of a cutting edge of a tool (mm).

13. A manufacturing method of an optical component or a molding die of the optical component comprising the steps of:
cutting a surface of a work with a tool by rotating the tool around its axis with a cutting edge facing outward and moving in a circle to cut the work surface at a point of the circle while relatively moving the tool and the work in a line direction crossing to the axis of the tool at a predetermined feed speed;
cutting the work surface by a next line after relatively moving the tool and the work in a pitch direction perpendicular to the line direction by a pick feeding distance; and
polishing a worked surface after completion of the cutting steps,
wherein the above cuttings are carried out under the following conditions:
$10000 \leq S \leq 30000$;
$(F/S)^2/8D \leq 40$ nm;
$f^2/8r \leq 40$ nm,
where
S: tool rotation speed (rpm);
F: feed speed (mm/min);
D: rotation radius of a cutting edge of a tool (mm);
f: pick feeding distance (mm);
r: nose radius of a cutting edge of a tool (mm).

14. The manufacturing method of the optical component or the molding die of the optical component according to claim 13,
wherein the tool rotation speed S (rpm) in the cutting steps is in a range of:
$10000 \leq S \leq 20000$.

15. The manufacturing method of the optical component or the molding die of the optical component according to claim 13,
wherein a surface roughness Ry of the worked surface is made 10 nm or less by the polishing step.

16. The manufacturing method of the optical component or the molding die of the optical component according to claim 13,
wherein the feed speed F (mm/min) in the cutting steps is in a range of:
$300 \leq F \leq 2000$.

17. The manufacturing method of the optical component or the molding die of the optical component according to claim 13,
wherein the rotating radius D (mm) of the cutting edge of the tool in the cutting steps is in a range of:
$5 \leq D \leq 15$.

18. The manufacturing method of the optical component or the molding die of the optical component according to claim 13,
wherein the pick feeding distance f (mm) in the cutting steps is in a range of:
$0.04 \leq f \leq 0.08$.

19. The manufacturing method of the optical component or the molding die of the optical component according to claim 13,
wherein the nose radius r (mm) of the cutting edge in the cutting steps is in a range of:
$5 \leq r \leq 20$.

20. The manufacturing method of the optical component or the molding die of the optical component according to claim 13,
wherein the feed speed F (mm/min), the rotating radius D (mm) of the cutting edge of the tool, the pick feeding distance f (mm), the nose radius r (mm) of the cutting edge of the tool in the cutting steps are in ranges of:

$300 \leqq F \leqq 2000$;
$5 \leqq D \leqq 15$;
$0.04 \leqq f \leqq 0.08$;
$5 \leqq r \leqq 20$.

* * * * *